United States Patent
Gehring et al.

(10) Patent No.: US 7,237,790 B2
(45) Date of Patent: Jul. 3, 2007

(54) SYSTEM FOR HITCHING A TRAILER TO A MOTOR VEHICLE

(75) Inventors: Ottmar Gehring, Kernen (DE); Harro Heilmann, Ostfildern (DE); Frederic Holzmann, Stuttgart (DE); Andreas Schwarzhaupt, Landau (DE); Gernot Spiegelberg, Heimsheim (DE); Armin Sulzmann, Ottersheim (DE)

(73) Assignee: DaimlerChrysler AG, Stuttgart (DE)

( * ) Notice: Subject to any disclaimer, the term of this patent is extended or adjusted under 35 U.S.C. 154(b) by 199 days.

(21) Appl. No.: 11/091,210

(22) Filed: Mar. 28, 2005

(65) Prior Publication Data

US 2006/0038381 A1 Feb. 23, 2006

(30) Foreign Application Priority Data

Jun. 17, 2004 (DE) .................. 10 2004 029 129

(51) Int. Cl.
*B60D 1/36* (2006.01)

(52) U.S. Cl. ...................... 280/477; 340/431
(58) Field of Classification Search ............... 280/477, 280/434, 504; 340/431

See application file for complete search history.

(56) References Cited

U.S. PATENT DOCUMENTS

| 5,191,328 | A  | * | 3/1993  | Nelson ............... 340/870.06 |
| 5,455,557 | A  | * | 10/1995 | Noll et al. ............... 340/431 |
| 5,951,035 | A  | * | 9/1999  | Phillips et al. ............. 280/477 |
| 6,120,052 | A  | * | 9/2000  | Capik et al. ............... 280/477 |
| 6,222,457 | B1 | * | 4/2001  | Mills et al. ............... 340/686.1 |
| 6,581,695 | B2 | * | 6/2003  | Bernhardt et al. .......... 172/439 |
| 6,970,184 | B2 | * | 11/2005 | Hirama et al. ............. 348/148 |
| 2005/0046147 | A1 | * | 3/2005  | Piper et al. ............... 280/477 |

* cited by examiner

*Primary Examiner*—Tony Winner
(74) *Attorney, Agent, or Firm*—Akerman Senterfitt; Stephan A. Pendorf; Yonghong Chen

(57) ABSTRACT

A system for coupling a trailer (2) to a motor vehicle (1), in particular a trailer (2) to a motor tractor (1), is provided with an image sensor (5), which is located in the coupling area. The coupling process involves connecting a trailer coupler (4) of the motor vehicle (1) and a tow bar (3) of the trailer (2), which is detected by an image sensor (5) detecting a movement of a locking element (8) associated with the trailer coupling (4). Thereupon a process of braking of the motor vehicle (1) is initiated.

9 Claims, 3 Drawing Sheets

SYSTEM FOR HITCHING A TRAILER TO A MOTOR VEHICLE

BACKGROUND OF THE INVENTION

1. Field of the Invention

The invention concerns a system for hitching a trailer to a motor vehicle, in particular hitching a trailer to a motor tractor, including an imaging sensor, which is located in the area of the hitch.

2. Related Art of the Invention

The hitching of a trailer to a motor vehicle such as a motor tractor is often associated with effort and difficulty and very often requires the cooperation of various persons. Generally the coupling of the trailer to the motor tractor occurs in that the motor tractor moves backwards towards the trailer until the coupling device located on the trailer has approached the coupler or hitch located on the motor tractor to the extent that both can be connected to each other. The driver of the motor tractor has, however, while driving backwards, no view of the field of action, and attempts, blindly, to superimpose the coupling parts of the trailer and the motor tractor. Therein it frequently occurs that the operator drives too close to the trailer so that the tow bar damages the back end of his motor tractor. In this manner damage frequently occurs when the coupler of the motor vehicle is not precisely aligned with the ball-shaped head of the trailer tow bar, or the backing up ceases prior to the coupling process so that an offset remains in the longitudinal and/or transverse direction. In each case the driver must exit the vehicle and investigate the position of the coupler with respect to the trailer tow bar, in order then to try again, since the manual movement of the tow bar in the case of heavy trailers is, as a rule, impossible.

Further, it is known to employ motor vehicles with collision warning devices, wherein the collision warning device includes for example ultrasound sensors, which can determine the distance to other objects in close proximity to the vehicle. Herein the collision avoidance devices are so designed, that a warning signal is emitted upon exceeding a predetermined minimum separation. The collision avoidance devices known until now, which operate on the echo principle, are preferably installed in the cabin area and emit into the area behind the motor vehicle which is not observable by the driver. From this, however, only the type of information can be obtained, which only very generally informs the driver whether an object is located in the rear area of the motor vehicle and what distance this object has from the motor vehicle and when the brakes must be activated. It is herein however a disadvantage that, in many cases, in particular during coupling of the motor vehicle to a trailer, the mere information that an object is present is not sufficient, but rather information is desired regarding the precise location or, as the case may be, position of the object.

From DE 102 37 615 C1 a process and device are known for positioning the coupling device or hitch of the trailer relative to a coupler of a motor tractor. The two couplings have longitudinal axis, which are oriented essentially parallel to each other in that the trailer side coupling device and the motor tractor coupler are moved relative to each other in such a manner, that the same number of receivers on both sides of a central point of the receiver device receive signal emissions from the trailer with the same intensity. Then the two couplings can be moved towards each other using distance measurement by means of a transmitter and a receiver unit. For the positioning of the two coupling elements to each other, not only the distance but also the orientation of their longitudinal axis is determined. In this manner it becomes possible to so direct the motor tractor towards the trailer that the trailer coupling device and the motor tractor coupler are so close to each other that they can be connected to each other and simultaneously the longitudinal axis of the motor tractor aligns with that of the trailer. Therein the transmitter is associated with the longitudinal axis of the motor tractor, while the receiver unit is associated with the longitudinal axis of the trailer. The signal emissions received by the receiver unit are processed via a microcomputer into data to produce spoken or visual displays by means of a computer. In this manner the driver of the motor tractor obtains the information regarding the orientation of the motor tractor coupler relative to the trailer coupling device.

SUMMARY OF THE INVENTION

It is the task of the invention to provide a system for hitching a trailer to a motor vehicle, particularly a trailer to a motor tractor, which makes possible a precise and rapid hitching of the trailer to the motor vehicle.

In accordance with the invention this task is solved by the system for coupling a towed vehicle to a motor vehicle, in particular a trailer to a motor tractor, with an image sensor, which is located in the coupling area, thereby characterized, that the coupling process involving connecting a trailer coupler (4) of the motor vehicle (1) and a tow bar (3) of the trailer (2) is detected by an image sensor (5) detecting a movement of a locking element (8) associated with the trailer coupler (4), whereupon a process of braking the motor vehicle (1) is initiated.

In accordance with the invention, during the coupling process of the trailer to the motor tractor, an image sensor, which is located in the area of the coupling, is employed, wherein the image sensor detects the connecting of the coupler or hitch of the motor tractor with the tow bar of the trailer by detecting movement of a locking element associated with the motor vehicle coupler, which is for example in the form of a lever element and which during coupling is brought from an upper position into a lower position and therewith completes the coupling. If the image sensor detects a movement of the locking element, then the process of braking the motor tractor is initiated. Therein it becomes possible to so display the recorded images from the image sensor to the driver of the motor tractor via the display, in order to therewith signal the driver, that the brake movement is to be initiated. The term "initiation of the brake process" is also understood to include a signal presented in the cabin of the motor vehicle which indicates to the driver that he is to manually initiate the brake process. Likewise, a control unit, which is provided in the motor tractor and controls the image sensor, can send a signal to a brake control unit, which then initiates an automatic braking of the motor tractor following movement of the locking element. One essential advantage thereby is comprised therein, that in this manner a rapid coupling can be ensured and the brake process can be controlled and checked.

As the image sensor herein, there can be employed for example a camera. Suitable cameras include for example cameras with CCD or CMOS chip technology which could be sensitive in the visible as well as in the non-visible wavelength region. Also suitable are distance resolving image sensors, these include for example laser scanners, distance image cameras, image-providing near-range radar or at least two cameras, which are provided on the motor vehicle in a stereo arrangement.

In one embodiment of the invention it can be provided, that the trailer coupler of the motor vehicle includes a sensor for detection of the opening condition of the trailer coupler, wherein the sensor emits a signal upon coupling of the trailer to the motor vehicle, so that the brake process of the motor vehicle is initiated. In addition a further sensor can be provided for detection of the movement of the locking element by means of the image sensor, which emits a signal, for example in the driver cabin, upon coupling or as the case may be insertion of the tow bar in the coupler of the motor tractor, in order therewith likewise to raise attention that the motor tractor must be stopped, since the tow bar is connected to the trailer coupling of the motor tractor. The supplemental signal can therein be advantageous, in the case that the driver of the motor tractor is, for example, not monitoring the display or is inattentive, and by the supplemental signal, for example an acoustic signal, is immediately alerted thereto that the brake process must be initiated.

Further advantageous embodiments of the invention can be seen from the remaining dependent claims. In the following, illustrative embodiments of the invention are represented schematically.

BRIEF DESCRIPTION OF THE DRAWINGS

Therein there is shown.

DETAILED DESCRIPTION OF THE INVENTION

Figure 1:
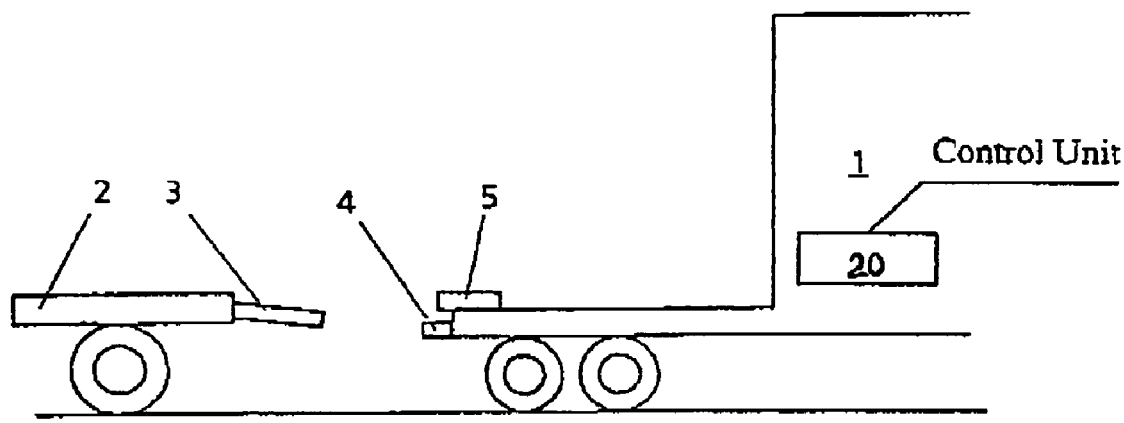
FIG. 1 a schematic representation of a motor vehicle, in particular a motor tractor, during the coupling process to a towed body, in particular a trailer.
Figure 2:
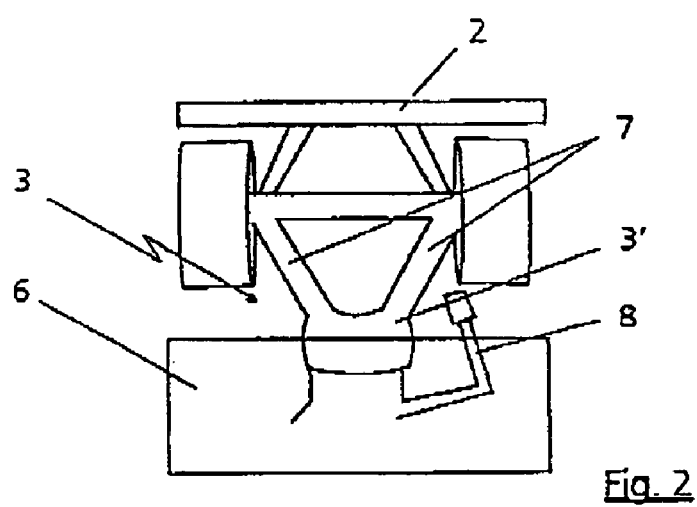
FIG. 2 a simplified representation of an image of a tow bar as taken by an image sensor.

In FIG. 1 a motor vehicle 1, which is here a motor tractor, and a towed vehicle 2, here a wailer, is shown. For coupling of the trailer 2 to the motor tractor 1 the motor tractor 1 must be parked ahead of the trailer 2. The motor tractor 1 is provided with a trailer coupler 4. The trailer 2 likewise exhibits a coupling element, namely a tow bar 3, which must be introduced into the trailer coupler 4 of the motor trailer 1, so that the trailer 2 is connected to the motor tractor 1. An image sensor 5, which is provided facing backwards at the rear of the motor tractor 1, for example, in the coupling area, records in real time an image as seen in FIG. 2. It is advantageous, when the image sensor 5 is located in the center of the breadth of the trailer 2 and above the trailer coupler 4 of the motor tractor 1. It is, however, likewise possible, that the image sensor 5 is integrated in the trailer coupler 4.

By means of a control unit 20, which is provided within the motor tractor 1, the image sensor 5 is controlled for recording an area behind the motor tractor 1, in particular for recording the tow bar 3. The image processing algorithm employed by the control unit works in two steps, wherein first the image sensor 5 finds the trailer 2 and locks onto this in the image, and the tow bar end of the tow bar 3, which is located in the area 3' in FIG. 2, should he located. In a second step it is determined which displacement in the image or, as the case may be, transverse movement, is to be carried our so that the trailer 2 and the tow bar 3 can be brought to assume a central position in the image or, as the case may be, the zone 6, which here is indicated with a rectangle. By means of the image processing algorithm herein the tow bar 3 or, as the case may be, the end of the tow bar, is recognized, in that first a part of the tow bar 3 is found in the image and then the end of the tow bar is recognized by extrapolation. The contours of the tow bar elements 7 are therein detected on the basis of lines in the image by means of known segmenting processing.

In FIG. 2 there is shown likewise in the area of the zone 6 a locking element 8 associated with the trailer coupler 4, which is brought into motion upon introduction of the tow bar end in the trailer coupler 4 of the motor tractor 1 and moves in the downwards direction. Thereby a bolt moves into a recess or opening in the tow bar end, whereby a fixed coupling condition results.

Figure 3:
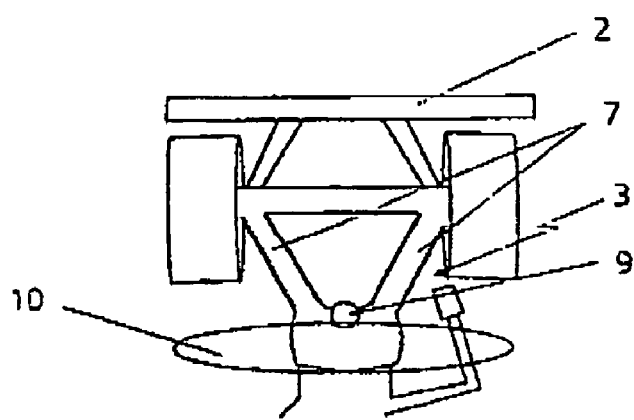
FIG. 3 a representation of the modeling of the tow bar in the image.

In FIG. 3 the most important contours of the tow bar elements 7, the extrapolated end point 9 of the tow bar 3 and the target zone 10 into which the tow bar end is to be located upon coupling, for control are shown. The image recorded by the image sensor 5 is first extrapolated and thereby an edge image is produced. The extrapolation is calculated for example using the Sobel-operator. The Sobel-operator amplifies the structures in the image and processes or works with a contour template or mask, which preferably exhibits a matrix with 5×5 elements, which is slid over the input image. By the matrix, the environment of the pixels, which are located under the center of the matrix, are observed. Therein the pixel of the input image is multiplied with the value in the corresponding matrix cell and the product is added. The sum represents the gray value of the pixel in the center of the matrix. This value is entered into the filtered image. Depending upon the selection of the matrix elements, either horizontal, vertical or diagonal edges can be detected. By means of the Sobel-operator good results can be achieved even with contrast-poor images, which are present in this case. Therein preferably only the value of the derivative is stored. Thereafter the images are converted into a binary image. For this, the values of the derivative below a threshold value are set at 0, and above a threshold value are set at 1, wherein 0 represents a white pixel in the image and 1 represents a black pixel in the image. The threshold value is herein determined, for example, empirically, or it is possible to employ an adaptive threshold value. The result is a binary image, wherein, besides the contour lines of the tow bar 3, a number of further lines are contained. Lines of this kind can be described by the following equation:

$$x \cdot \cos(\theta) + y \cdot \sin(\theta) + \rho = 0 \qquad a.$$

Figure 4:
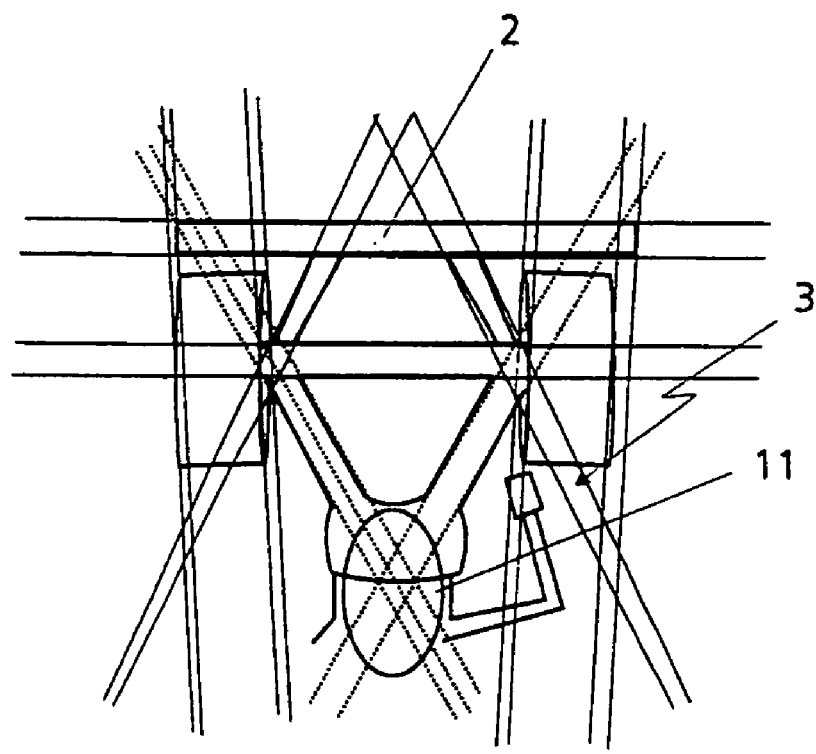
FIG. 4 a representation of lines of a derived image obtained by Hough-transformation.

In the next step the unnecessary lines in the image, which do not belong to the trailer or, as the case may be, the contour lines of the tow bar 3, are filtered. In the framework of the filtering, next preferably a Hough transformation is carried out, wherein the lines contained in the 2D binary image are transformed with the coordinates x and y into a 3D-image space. Thereafter the transformed values are filtered. The values, which lie below a certain threshold value, are set to 0 and no longer processed. As however seen from FIG. 4, a few unnecessary lines remain after the filtering, which are not necessary for coupling of the trailer 2 to the motor tractor 1. The lines necessary for coupling intersect or transect always in the same zone, which is represented in the figure with reference number 11 and identified by Gaussian approximation. The zone 11 is therein located in the lower center of the image, wherein the most important lines are always arranged at an angle of between 5° and 30° relative to each other. The lines which are located in zone 11 are stored.

Figure 5:
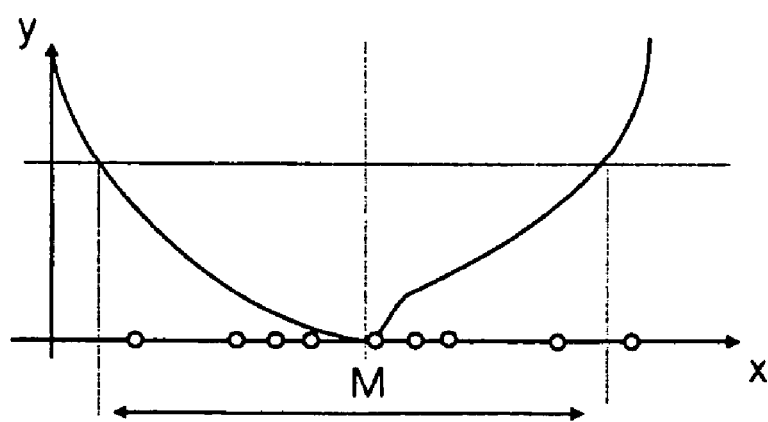
FIG. 5 a graphic representation for selection of a target zone.

By means of a horizontal and vertical section it can be recognized, in which area of the zone 11 75% of the converging pixels to be found. By means of a graphic of this type as shown in FIG. 5, wherein the x-axis represents the position of the pixel, the y-axis represents the closest of the convergence in % and the horizontal dotted line in the upper area of the graphic represents the threshold value, which lies at 75%, it can be calculated, in which area 75% of the convergence pixels are located. This area then corresponds or presents, depending upon the viewed segment, the breadth or the length of zone 11 which here is represented by a level arrow in both directions at the lower end of the graph. The position of the target point therein represents the center M of the represented zone 11 in the graphic.

On the basis of the known position or location of zone 11 in the image the distance between motor vehicle and the trailer can be estimated relatively precisely, even when the distance could be several meters.

The control of the motor tractor 1, in order to arrive at the correct position relative to the trailer 2, occurs in transverse direction and in height or elevation. The control in the transverse direction occurs by the change of the steering angle is based for example on a PID-controller. The steering angle is transmitted as desired value via a data bus (CAN bus) to the control unit.

Figure 6:
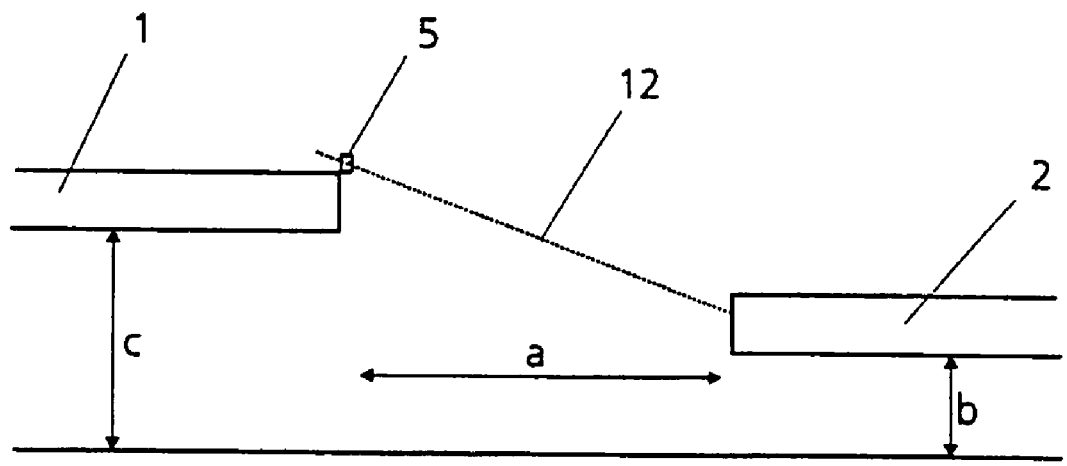
FIG. 6 a schematic representation of the elevation position to be determined of the motor vehicle relative to the trailer.

The height control is carried out by changing the level of the motor vehicle. The height of the coupling element of the motor vehicle necessary for coupling is, for this, preferably determined on the basis of the data from the image sensor. The image processing algorithm employed for this requires therefore information regarding the distance or, as the case may be, the height of the trailer 2 relative to the motor tractor 1. As shown in FIG. 6, for this the sequence of observed beams, in particular their angles, are evaluated pixel-precise. This means, the closer the trailer 2 comes to the motor tractor 1, the steeper run the observed beams 12. The distance of the trailer 2 to the motor tractor 1 can be roughly determined therefrom. In order to position the motor tractor 1 precisely in the height of the trailer 2, well known trigonometric formulas are employed. Since the trailer 2 has a constant height b, the height c of the motor tractor 1 must be calculated on the basis of the distance a of the motor tractor 1 to the trailer 2. The dotted line 12 represents herein one observed beam, which was taken from the image sensor 5 on the motor tractor 1. Using a PID-controller the difference in height can be corrected, so that the motor tractor 1 has the same height as the trailer 2.

After the height of the motor tractor 1 corresponds to the height of the trailer 2, now the tow bar end of the tow bar 3 of the trailer 2 can be introduced into the trailer coupling 4 of the motor tractor 1. As soon as the tow bar end of the tow bar 3 is introduced into the trailer coupling 4 of the motor tractor 1 or as the case may be during its introduction, the lever 8 moves downwards. This situation is recorded by the image sensor 5 and, via the control unit, is displayed to the driver of the motor trailer 1 on a display. This indicates therewith that the coupling process has been accomplished and the braking process must be initiated. The braking process can however also be initiated automatically by the control unit, so that the brakes are automatically locked.

Since the trailer 2 does not block the motor tractor 1 and therewith represents, upon coupling of the trailer 2, a center of gravity relative to the motor tractor 1, the carriage of the motor tractor 1 sinks. The evaluation of the sinking of the carriage of the motor vehicle, by means of a image providing sensor, can supplementally be used for initiation of the brake process. In this situation the torque of the motor tractor 1 increases. If a trailer coupler 4 with a sensor for detection of the opening condition of the trailer coupler 4 is employed, then as an alternative, or additionally, the signal of the sensor can be introduced into a power train controller as a stop signal, so that this appropriately controls braking at the right moment. It is to be noted that only one of the three illustrated possibilities for initiating the braking process could be employed of course, all three possibilities could be freely combined with each other.

Figure 7:
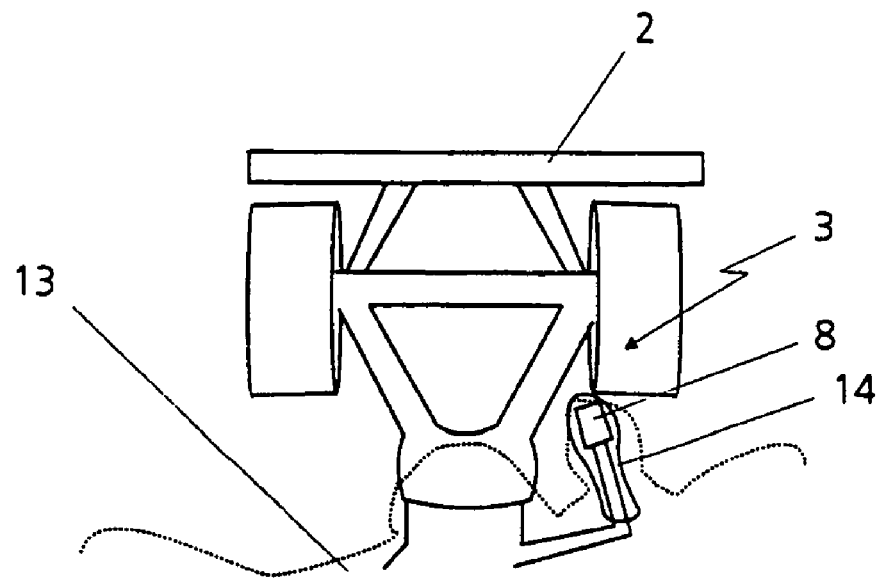
FIG. 7 a schematic representation of the detection of a locking element in an image.

FIG. 7 shows in detail the image recorded by image sensor 5 of the locking element 8 for an initiation of the brake process. So that in this manner an initiation of the brake process can be undertaken, it is first necessary that the image processing algorithm finds the locking element 8 in the image recorded by the image sensor 5. The position is however previously not known, since this depends upon whichever coupling model is present. The trailer coupler 4 and the locking element 8 are static in the image, since they are part of the motor tractor 1. A time duration is thereafter carried out for each recorded image sensor 5 during the coupling process. The pixel with small changes, wherein the changes come from oscillations or light modifications, are defined as static. The static part is seen with the reference numbers 13 in FIG. 7. The non-static part, which represents the locking element 8, is defined as a zone with different continuity and has the reference number 14. When an area of the static part 13 in the image demonstrates a very large movement, then this is displayed or, as the case may be, signaled to the driver of the motor tractor 1 and he will register or take note of the falling locking element 8. Thereafter the driver can manually initiate the braking process or, in the case of automatic operation, can monitor that the trailer 2 is coupled to the motor tractor 1.

The coupling system can be operated by activation of a push button by the driver in the cabin of the tractor 1, by radio remote operation, or by a master control station, for example by radio.

The invention claimed is:

1. A system for coupling a tow bar of a trailer to a trailer coupler of a motor vehicle, with an image sensor located in the coupling area,
    wherein the coupling process involves connecting the trailer coupler (4) of the motor vehicle (1) and the tow bar (3) of the trailer (2),
    wherein a coupling is detected by the image sensor (5) detecting a movement of a locking element (8) associated with the trailer coupler (4),
    wherein upon the detection of the coupling, a process of braking the motor vehicle (1) is initiated.

2. The system according to claim 1, wherein the trailer coupler (4) of the motor vehicle (1) includes a sensor for detection of an open condition of the trailer coupler (4).

3. The system according to claim 2, wherein the sensor emits a signal upon coupling of the trailer (2) to the motor vehicle (1), so that the process of braking of the motor vehicle (1) can be initiated.

4. The system according to claim 3, wherein the emitted signal is relayed to a control unit, which automatically initiates the process of braking.

5. The system according to claim 1, wherein upon an increase in the engine torque of the motor vehicle (1) the process of braking is initiated.

6. The system according to claim 1, wherein the process of braking is initiated upon noticing a drop in the rear of the motor vehicle (1) by means of the image sensor (5).

7. The system according to claim 1, wherein the coupling process involves a transverse and/or elevation control of the motor vehicle (1).

8. The system according to claim 1, wherein the image sensor (5) is located in an area above the trailer coupler (4) of the motor vehicle (1).

9. The system according to claim 1, wherein the image sensor (5) is integrated in the trailer coupler (4) of the motor vehicle (1).

* * * * *